(12) United States Patent
Barberis et al.

(10) Patent No.: US 9,403,405 B2
(45) Date of Patent: Aug. 2, 2016

(54) COUPLING SYSTEM OF A LOW FRICTION SEALING ASSEMBLY WITH A BEARING RING AND A HUB BEARING UNIT EQUIPPED WITH SUCH A SEALING ASSEMBLY

(71) Applicants:Giorgio Barberis, Volpiano (IT); Daniele Duch, San Gillio (IT); Fausto Morello, Sommariva del Bosco (IT); Maria Concetta Vulpio, Turin (IT)

(72) Inventors: Giorgio Barberis, Volpiano (IT); Daniele Duch, San Gillio (IT); Fausto Morello, Sommariva del Bosco (IT); Maria Concetta Vulpio, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/556,320

(22) Filed: Dec. 1, 2014

(65) Prior Publication Data
US 2015/0151574 A1 Jun. 4, 2015

(30) Foreign Application Priority Data

Nov. 29, 2013 (IT) .............................. TO2013A0980

(51) Int. Cl.
*F16C 33/78* (2006.01)
*F16C 33/76* (2006.01)
(Continued)

(52) U.S. Cl.
CPC ......... *B60B 27/0073* (2013.01); *B60B 27/0005* (2013.01); *F16C 33/783* (2013.01); *F16C 33/7879* (2013.01); *F16C 33/805* (2013.01); *B60B 2900/212* (2013.01); *B60B 2900/511* (2013.01); *F16C 2226/12* (2013.01); *F16C 2226/16* (2013.01); *F16C 2326/02* (2013.01)

(58) Field of Classification Search
CPC .. F16C 2226/16; F16C 33/783; F16C 33/805; F16C 2226/12; F16C 33/7879; F16C 2326/02; F16C 33/7869; B60B 27/0005; B60B 27/0073; B60B 2900/212; B60B 2900/511
USPC ......... 384/477, 478, 480–486, 544, 589, 488; 277/351–353, 402, 562
See application file for complete search history.

(56) References Cited

U.S. PATENT DOCUMENTS 4,669,895 A * 6/1987 Colanzi ................ F16J 15/3264
384/477
4,792,242 A * 12/1988 Colanzi ............... F16C 33/7859
384/478

(Continued)

FOREIGN PATENT DOCUMENTS

DE 102011088861 A1 6/2013
EP 1477694 A2 11/2004

(Continued)

*Primary Examiner* — Marcus Charles
(74) *Attorney, Agent, or Firm* — Bryan Peckjian; SKF USA Inc. Patent Dept.

(57) ABSTRACT

A sealing assembly including at least one first annular shield having a sleeve portion integral in use with a rotating member and a flange portion, which radially and overhangingly extends from the sleeve portion. Preferably, a second annular shield is arranged in front of the first shield with the interposition of an annular seal; wherein the sleeve portion of the first shield is delimited by a conic-truncated lateral mounting surface having a tapering facing so as to have a greater diameter arranged on the side of the flange portion and intended to couple in use with a mounting seat of the rotating member formed by a shallow recess delimited by a conic-truncated bottom wall having the same tapering as the lateral mounting surface and by an axial shoulder which is arranged on the side opposite to the flange portion.

7 Claims, 2 Drawing Sheets

(51) Int. Cl.
  *B60B 27/00* (2006.01)
  *F16J 15/16* (2006.01)
  *F16C 33/80* (2006.01)

(56) References Cited

U.S. PATENT DOCUMENTS

| | | | | |
|---|---|---|---|---|
| 4,799,808 A | * | 1/1989 | Otto | B61F 15/22 384/486 |
| 6,082,905 A | * | 7/2000 | Vignotto | F16C 19/184 384/484 |
| 6,497,514 B2 | * | 12/2002 | Maldera | F16C 19/186 277/353 |
| 6,729,626 B2 | * | 5/2004 | Ruetter | F16C 33/7883 277/572 |
| 7,021,830 B2 | * | 4/2006 | Takehara | B60B 27/00 384/484 |
| 7,073,950 B2 | * | 7/2006 | Vignotto | F16C 35/067 384/482 |
| 7,942,584 B2 | * | 5/2011 | Norimatsu | F16C 33/7883 384/544 |
| 8,303,190 B2 | | 11/2012 | Shigeoka | |
| 8,342,535 B2 | * | 1/2013 | Lattime | F16C 19/38 277/409 |
| 2006/0125189 A1 | | 6/2006 | Peschke | |
| 2010/0129018 A1 | * | 5/2010 | Shigeoka | B60B 27/0005 384/544 |
| 2012/0017731 A1 | | 1/2012 | Mastroianni et al. | |

FOREIGN PATENT DOCUMENTS

| | | | | |
|---|---|---|---|---|
| EP | | 1902863 A2 | 3/2008 | |
| FR | | 2529286 A1 | 12/1983 | |
| IT | EP | 1174718 A1 * | 1/2002 | F16C 33/7879 |
| WO | | 9716662 A1 | 5/1997 | |
| WO | WO | 2010069386 A1 * | 6/2010 | F16C 33/78 |

* cited by examiner

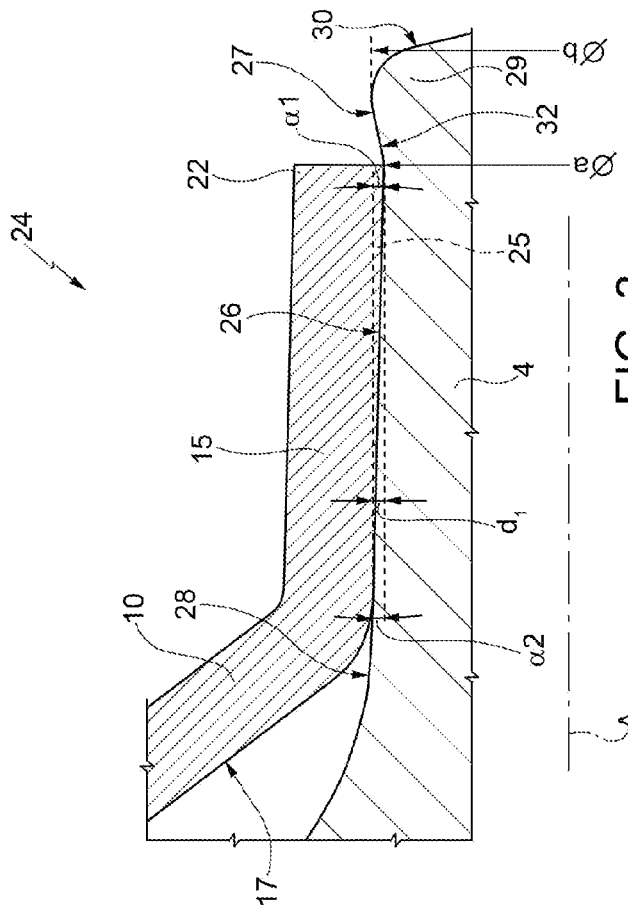
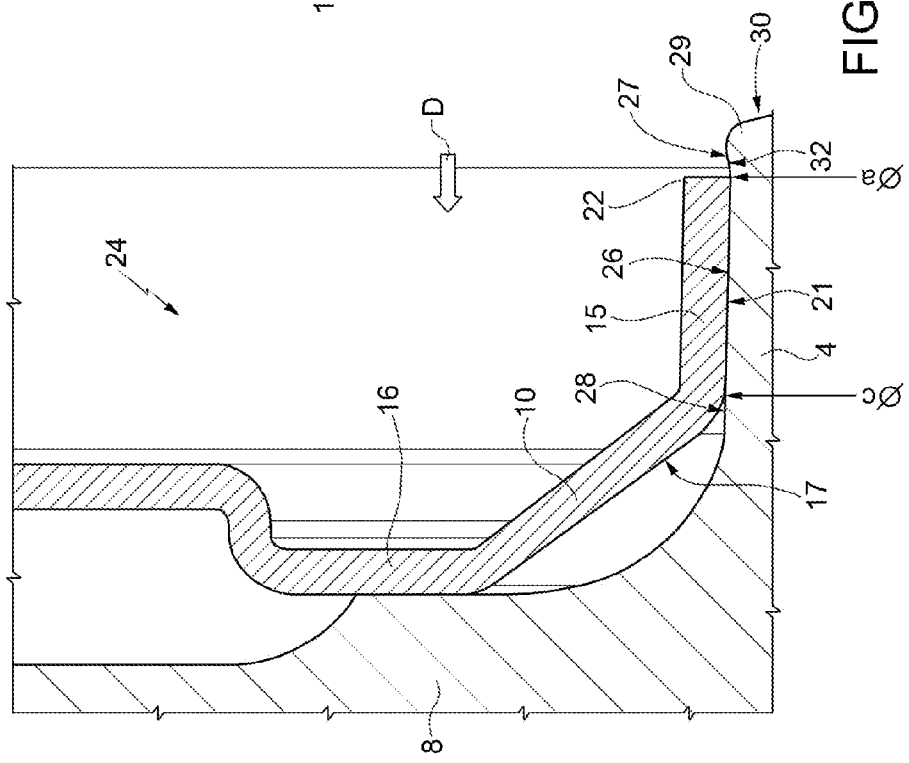

COUPLING SYSTEM OF A LOW FRICTION SEALING ASSEMBLY WITH A BEARING RING AND A HUB BEARING UNIT EQUIPPED WITH SUCH A SEALING ASSEMBLY

CROSS REFERENCE TO RELATED APPLICATION

This is a National Stage application claiming the benefit of Italy Patent Application Number TO2013A000980 filed on 29 Nov. 2013 (29 Nov. 2013), which is incorporated herein by reference in its entirety.

TECHNICAL FIELD OF THE INVENTION

The present invention relates to a coupling system between a member of a low friction sealing assembly, in particular for equipping rolling bearings of hub bearing units for vehicles, and a rotating ring of a rolling bearing belonging to a hub bearing unit and to the hub bearing unit thus equipped.

PRIOR ART

The sealing assemblies intended to equip the rolling bearings of hub bearing units on the side of the flange which supports the wheel, called "outboard", for example, such as those described in U.S. Pat. No. 8,303,190 and in US2012/0177315, are formed by "cassette" seals, which include a first and a second annular shield, generally L-shaped in radial section, mounted in front of each other so as to delimit an annular chamber between the shields, within which is arranged a series of sealing lips carried by an annular seal integrally fixed to one of the shields, generally the shield intended to remain stationary in use.

However, it has been found that the shield mounted on the ring rotating in use, and thus next to the wheel supporting flange, moves axially in use with respect to the bearing ring on which it is mounted, because of the deflection of the flange, i.e. the deformations to which the flange is subjected by the wheel while the vehicle is cornering.

On one hand, this drawback increases the friction on the sealing assembly, because the non-sliding sealing lips (which thus do not generate friction) may become sliding (and thus generate friction), and the possibly sliding sealing lips increase their interference, and thus the generated friction. On the other hand, in the case of relatively large displacements, an interference between the rotating shield and the stationary ring of the bearing may be generated, with the generation of very high frictions and with possible damage to the sealing assembly, and in the more severe cases, to the rolling bodies of the bearing.

SUMMARY OF THE INVENTION

It is the object of the present invention to provide a sealing assembly comprising at least one shield rotating in use having a coupling system of such a shield with a ring rotating in use of a rolling bearing, which are free from the described drawback, and moreover have low costs and high ease of production, high protection efficiency of the rolling bodies, reduced axial and radial dimensions and a low friction.

According to the invention, are thus provided a coupling system of a shield of a sealing assembly with a ring of a rolling bearing having the features disclosed in the appended claims.

Furthermore, the present invention provides a hub bearing unit comprising:

an outer ring, stationary in use,
an inner ring, rotating in use, having an end provided with a flange on the side opposite to the outer ring,
at least one crown of rolling bodies interposed between the outer ring and the inner ring, and
a sealing assembly comprising at least one first shield provided with a first sleeve portion integral in use with the inner ring and a first flange portion which extends radially and overhangingly from the first sleeve portion, the first shield being mounted radially interposed between the outer ring and the inner ring so that the first flange portion is arranged axially interposed in an annular space comprised between the flanged end and the outer ring;
wherein the first sleeve portion of the first shield is delimited by a lateral mounting surface facing towards the inner ring and having conic-truncated geometry having tapering directed so that the greater diameter of the lateral mounting surface is arranged on the side of the first flange portion and essentially at a first end of the first sleeve portion from which the first flange portion extends radially and overhangingly;
wherein the inner ring has between the flanged end and a frontal free rim thereof which delimits a rolling track for the rolling bodies,
a later cylindrical surface provided with an assembly seat for the sleeve portion of the first shield, which assembly seat is defined by an annular shallow recess delimited by a conic-truncated bottom surface having tapering facing the same direction as the tapering of the lateral assembly surface; and
an axial shoulder arranged on the side opposite to the flange portion; the conic-truncated bottom surface of the annular shallow recess having a length in axial direction essentially identical to the extension in length in axial direction of the first sleeve portion and the axial shoulder being defined by an annular relief which delimits the shallow recess towards a frontal free rim of the rotating annular member; wherein, in combination:
i)—the annular relief of the rotating annular member has a rounded saw-tooth profile in radial section defined towards the shallow recess by a conical surface with tapering facing the side opposite to the conic-truncated shaped surface and which joins to the conic-truncated shaped surface, so that the total axial length of the annular shallow recess is greater than that of the first sleeve portion in the direction of extension in axial direction of the conical surface of the annular relief; and
ii)—the annular shallow recess defining the assembly seat of the rotating annular member is obtained on a lateral cylindrical mounting surface of the rotating annular member starting from the side opposite to the frontal free rim of the annular rotating member, the diameter of the lateral cylindrical mounting surface of the rotating member is essentially either equal to or slightly greater than the diameter of the annular relief at a maximum radial height thereof.

BRIEF DESCRIPTION OF THE DRAWINGS

The invention will now be described with reference to the accompanying drawings which illustrate a non-limitative embodiment thereof, in which:

FIG. 2 diagrammatically shows in radial section and on enlarged scale a detail of a shield being part of the sealing assembly in FIG. 1 and of a coupling system of such a shield with a ring of the rolling bearing being part of the hub bearing unit in FIG. 1; and FIG. 3 shows in further enlarged scale the details of the coupling system according to the invention.

DETAILED DESCRIPTION

Figure 1:
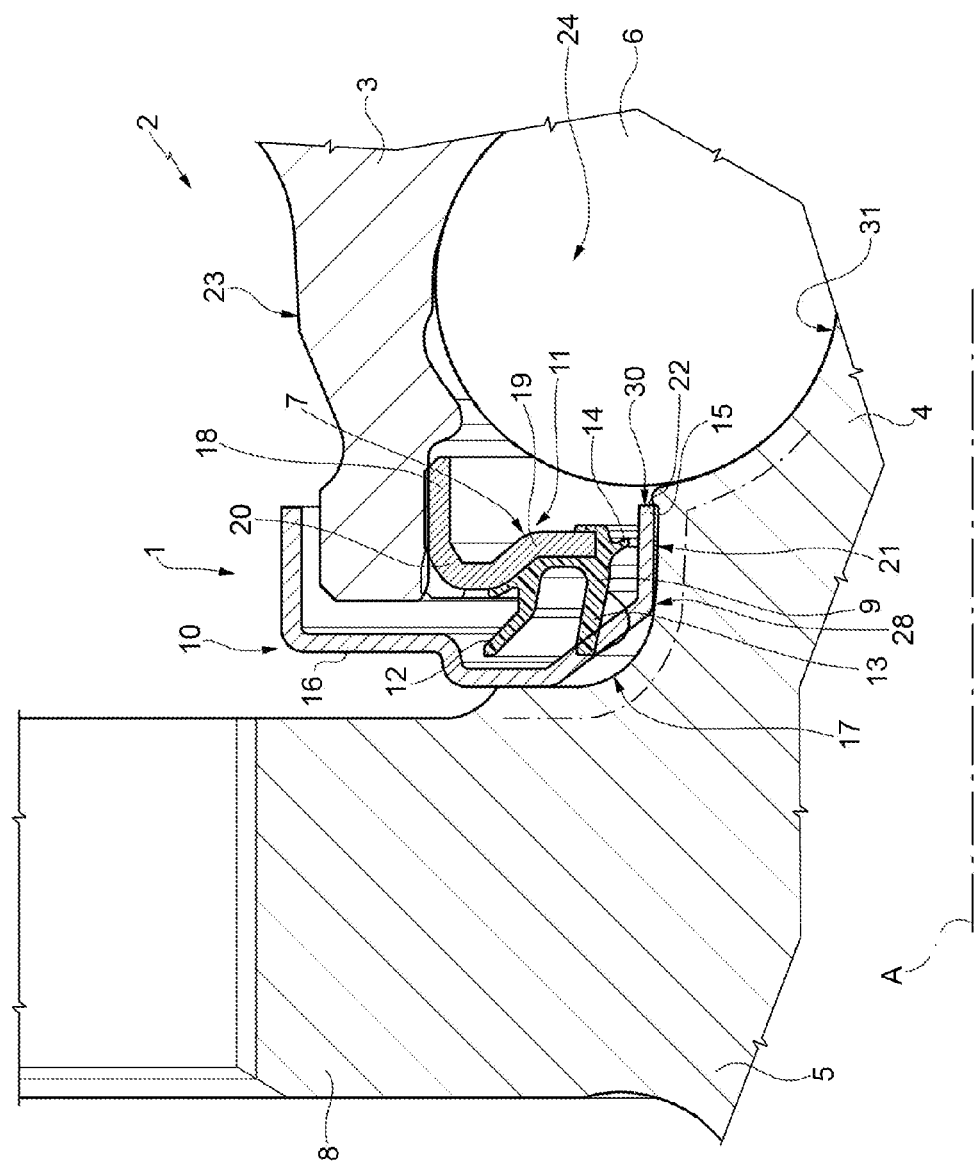
FIG. 1 diagrammatically shows in radial section a longitudinal elevation view, with parts removed for the sake of simplicity, of a hub bearing unit made according to the invention and incorporating a sealing assembly according to the invention.

With reference to FIG. 1, reference numeral 1 indicates a low friction sealing assembly, in particular designed to be mounted on a hub bearing unit 2 of a vehicle, of which the sealing assembly 1 becomes an integral part in use.

The hub bearing unit 2 comprises an outer ring 3, stationary in use, an inner ring 4, rotating in use about an axis A, which is also the symmetry axis of both rings 3 and 4 of the sealing assembly 1, and at least one crown of rolling bodies 6 interposed between the outer ring 3 and the inner ring 4, which are mutually coaxial; the ring 4 has an end 5 provided with a flange 8 opposite to the outer ring 3 and intended to carry a wheel of the vehicle in use.

The sealing assembly 1 can be inserted in an annular gap 7 delimited between the inner ring 4 and the stationary outer ring 3 of the hub bearing unit 2 and, more in general, between the rotating member 4 and the stationary member 3, which are mutually coaxial, of a generic rolling bearing of any known type, either being part of or integrated with the hub bearing unit 2.

The sealing assembly 1 is interposed between the rings 3 and 4, inserted in the annular gap 7, to protect the rolling bodies 6 arranged between the stationary member 3 and the rotating member 4, and comprises: a first annular shield 10, obtained by shearing and pressing of a metallic sheet, preferably made of stainless steel, a second annular shield 11, also obtained by shearing and pressing of a metallic sheet, preferably made of stainless steel, arranged facing the shield 10, and an annular sealing ring 9, made of one or more elastomeric materials, integrally carried by the shield 11 and provided with a plurality of sealing lips 12,13,14, which, as explained below, cooperate with the shield 10 for sealing towards the rolling bodies 6 the annular gap 7 in a fluid-tight manner.

The shield 10 is provided with a first sleeve portion 15 defined by a tubular solid of revolution, integral with the rotating member 4 in use, and a first flange portion 16, which radially and overhangingly extends from the sleeve portion 15, in the illustrated non-limiting example on the side opposite to the axis A, thus radially outwards, starting from an end 17 of the sleeve portion 15 facing towards the flanged end 5.

The shield 11 is provided with a second sleeve portion 18, cylindrical tubular in the case in point, integral in use with the stationary member 3 and with a second flange portion 19, overhangingly carried by the sleeve portion 18 radially from the side opposite to the flange portion 16 and in front thereof; therefore, the flange portion 19 extends radially inwards, towards the axis A and towards the sleeve portion 15, starting from an axial end 20 of the sleeve portion 18, facing towards the shield 10 and the flanged end 5 in the illustrated non-limiting example.

The lips 12 and 14 of the annular seal 9 do not touch the shield 10 in use, while the lip 13 is preferably configured as a sliding lip, intended to cooperate with slight axial interference with the flange portion 16 in use.

In the case in point, the flange portion 16 extends in radial direction out from the annular gap 7, radially and overhangingly with respect to a radially outer lateral surface 23 of the ring 3, the ring 3 thus faces the radially outermost part of the flange portion 16.

According to an aspect of the invention, in order to prevent the shield 10 from moving towards the ring 3 and the respective shield 11 in use, the seal 1 according to the invention comprises at least one shield, in the case in point the shield 10, the first sleeve portion 15 of which is delimited towards the inner ring 4 by a lateral mounting surface 21 towards the rotating member defined by the ring 4 having conic-truncated geometry with tapering directed so that a greater diameter $\phi c$ of the lateral mounting surface 21 (FIG. 2) is arranged on the side of the first flange portion 16 and substantially at the first end 17 of the flange portion 15 from which the flange portion 16 radially and overhangingly extends.

Hereinafter, "tapering" of a conical or conic-truncated surface (i.e. of a conical surface truncated between two mutually parallel planes which are perpendicular to a symmetry axis of the conical surface about which axis its generatrix rotates) means the direction on the part of which the generatrix converges towards the symmetry axis, i.e. the direction (or more properly, the sense) on the part of which the vertex or apex of the conical surface is arranged, i.e. of a cone delimited by the conical surface.

So, the lateral mounting surface 21 is a surface which converges towards axis A on the side opposite to the flange 8 and to the flange portion 16 and which "widens", i.e. is flared, on the side of the flange portion 16.

In particular, the entire first sleeve portion 15 is defined by a tubular solid in revolution about axis A, which has a conic-truncated shape having tapering facing the side opposite to the first flange portion 16, at which it has the larger or maximum inner diameter $\phi c$, while at a second end 22, opposite to end 17, the first sleeve portion 15 has a smaller or minimum inner diameter $\phi d$.

Preferably, the lateral mounting surface 21 has a flaring angle $\alpha 2$ (FIG. 3) equal to a 2°±1° towards the first flange portion 16. In other words, the angle $\alpha 2$ is the angle defined between the lateral surface 21 and a parallel to the axis A tangent to the end 22 at the diameter $\phi d$, and thus corresponding to the angle formed by the lateral surface 21 with the axis A in the vertex or apex point of the cone that it forms.

According to a further aspect of the invention, at least the first shield 10 is made of a pressed, sheared metal sheet, so that the first sleeve portion 15 is elastically deformable at least towards the second end 22 thereof.

By means of the innovative shape which is imparted to the sleeve portion 15 instead of the usual cylindrical shape, a complete coupling system of a generic sealing assembly, in the case in point of the shield 10 of the sealing assembly 1, with a rotating annular member, in the case in point with the inner ring 4 of the bearing, the system being indicated as a whole by reference numeral 24, is made according to the invention.

The coupling system 24 comprises the first annular shield 10 of the sealing assembly 1, and in particular the sleeve portion 15 intended to couple in integral manner in use with the annular rotating member 4, in a mounting seat of the latter, and the mounting seat itself, where the sleeve portion 15 is delimited by the conic-truncated lateral mounting surface 21 towards the annular member 4 having a tapering facing so as to have a greater diameter $\phi c$ arranged on the side of the flange portion 16 of the shield 10 itself; and where the mounting seat for the shield 10 on the annular rotating member 4 is formed by an annular shallow recess 25 (FIG. 3) delimited by a conic-truncated bottom wall 26 having tapering facing the same sense as the tapering of the lateral mounting surface 21 and by an axial shoulder 27 arranged on the side opposite to the flange portion (FIGS. 2 and 3).

In particular, the mounting seat defined by the shallow recess 25 is obtained on a lateral fitting surface 28 of the rotating member, i.e. of the inner ring 4 in the illustrated example, normally intended to receive the shield 10 in use.

It is worth noting that, in order to improve the axial locking of the shield 10 on the fitting surface 28 of the flanged inner ring 4, it could also be sufficient to provide the keying portion of the shield 10 defined by the conic-truncated shaped sleeve portion 15 to be keyed on a mounting seat defined by the simple cylindrical-shaped fitting surface 28. Indeed, the tapering of the sleeve keying portion 15 makes such a portion capable of achieving a more stable coupling with the inner ring 4, by increasing the friction between the sleeve keying portion 15 and the fitting surface. However, during prolonged use, the stress to which the shield 10 is subjected in use causes the bending of the flange 8, generated, for example, by the wheel of the cornering vehicle, in all cases would not be sufficient because the elasticity that the conic-truncated fitting portion 15 must have, on the long run and under stress, would increase the play between the two members 15 and 4, thus thwarting the advantage of having a conic-truncated shape of the sleeve fitting portion 15.

Instead, the adoption of a conic-truncated keying portion 15, in combination with a mounting seat also having a conic-truncated fitting surface as the surface 26, which is axially delimited, as explained below, on the side opposite to the insertion direction D of the shield 10 on the annular member 4 in use, indicated by the arrow in FIG. 2, by the annular shoulder 27, surprisingly makes the mounting of the shield 10 definitely stable.

So, the complete coupling or keying system 24 according to the invention comprises the first sleeve portion 15 of the first shield 10, which defines a keying portion of the shield 10 on the annular member 4 as a solid of tubular revolution which has a conic-truncated shape having tapering facing the side opposite to the first flange portion 16; and, in particular, the length of the conic-truncated bottom wall 26 of the annular shallow recess 25 in axial direction is substantially equal to the extension in length, and axial direction, of the portion 15 of the shield 10.

Furthermore, of such a complete coupling or keying system 24 according to the invention also is part the axial shoulder 27, which, according to a further aspect of the invention, is defined by an annular relief or embossment 29 which delimits the shallow recess 25 towards a frontal free rim 30 of the annular rotating member 4; in the illustrated case in point, in which such an annular rotating member is defined by the inner ring 4 of a hub bearing unit 2, the frontal free rim 30 delimits a rolling track 31 for the rolling bodies 6 arranged on the side of the flange 8.

The annular relief 29 of the rotating annular member has a rounded saw-tooth profile in radial section (FIG. 3) defined towards the shallow recess 25 by a conical surface 3 with tapering facing the side opposite to the conic-truncated shaped surface 26 and which joins to the conic-truncated shaped surface 26, so that the total axial length of the annular shallow recess 25 is greater than that of the keying sleeve portion 15 in the measure of the extension in axial direction of the conical surface 32 of the annular relief 29.

Furthermore, the annular shallow recess 29 defining the mounting or keying seat carried by the annular rotating member 4 is obtained on the aforesaid lateral cylindrical surface 28 starting from the side opposite to the frontal free rim 30 and so as to become deeper towards the annular relief 29, at which the annular shallow recess 25 has a maximum radial depth equal to d1.

The diameter of the lateral cylindrical surface 28 of the annular rotating member or inner ring 4, which is indicated in FIG. 3 as φa, according to the invention, is substantially equal to or slightly greater than the diameter of the annular relief 29 at a maximum radial height thereof, indicated by φb in FIG. 3; in combination, the greater diameter φc of the conic-truncated lateral mounting surface 21 towards the rotating annular member 4 of the sleeve keying portion 15 is such to make an interference coupling, either forced or slightly forced, between the sleeve keying portion 15 and the keying seat defined by the annular relief 29 and by the shallow recess 25 already at the first end 17 of the keying portion 15 from which the flange portion 16 overhangingly extends, so that such a forced coupling starts from the first coupling of the end 17 with the relief 29 and is progressively consolidated as the keying portion 15 is inserted in direction D along the shallow recess 25 to become maximum at the diameter φa; the end 22 is then snappingly coupled in the shallow recess 25, after having "passed over" the relief of embossment 29 and, in particular, having gone beyond the conical surface 32 which constitutes the "gentlest side" of the rounded saw-tooth profile of the relief 29 and forming the axial shoulder 27.

The conic-truncated lateral mounting surface 21 towards the annular rotating member 4 of the sleeve keying portion 15 and the conic-truncated bottom wall 26 of the annular shallow recess 25 each have an inclination angle with respect to the common symmetry axis A of the annular rotating member 4 and of the first annular shield 10, indicated respectively as $\alpha 2$ and $\alpha 1$. The values of the angles $\alpha 2$ and $\alpha 1$ are, according to the invention, substantially comparable, i.e. are of the same order of magnitude and very close to each other, in the case in point they preferably differ for the only value of the permitted width tolerance for the angle $\alpha 2$, which is 1°.

In particular, the angle $\alpha 2$ formed between the common symmetry axis A and the conic-truncated lateral mounting surface 21 is preferably either equal to or slightly greater than the angle $\alpha 1$ (FIG. 3) formed between the conic-truncated bottom wall 26 of the annular shallow recess 25 and the common symmetry axis A.

With the described values and in the case of a hub bearing unit 2 for motor vehicles, the value of the maximum height of the relief 29, i.e. of the maximum depth of the shallow recess 25, measured in radial direction and with d1 in FIG. 3, may be comprised between 80 and 100 micron (these values are indicative only and non-limiting).

According to the invention, by virtue of the coupling system 24, a hub bearing unit 2 as the one described above, is obtained, in which, contrarily to the hub bearing units of the prior art, in which the shield 10 has a cylindrical keying portion which couples with the cylindrical surface 28 of the inner ring 4, which is comprised between the flange 8 and the track 31 adjacent thereto, the shield 10 has instead a sleeve-shaped keying portion 15, which has a conic-truncated shape and which is delimited by a lateral mounting surface 21 towards the inner ring 4 having a conic-truncated geometry and a tapering facing so that a greater diameter φc of the lateral mounting surface 21 is arranged on the side of the first flange portion 16 and substantially at the first end 17 of the keying portion 15 from which the flange portion 16 extends in radial and overhanging manner.

Furthermore, preferably in combination with such a feature, between the flanged end 5 and a frontal free rim 30, which delimits the rolling track 31 for the rolling bodies 6, the inner ring 4 has a lateral cylindrical surface 28 provided with a mounting seat for the sleeve keying portion 15 of the first shield 10, which mounting seat is defined by an annular shallow recess 25 delimited by a conic-truncated bottom wall 26 having a tapering facing the same sense as the tapering of the lateral mounting surface 21 and by an axial shoulder 27 arranged on the side opposite to the first flange portion 16.

It is understood that the invention is not limited to the embodiments described and illustrated herein, which are examples of embodiments of the low friction sealing assembly, which are instead susceptible of further changes related to shapes and arrangements of parts, and to constructive and assembly details.

The invention claimed is:

1. A coupling system of a sealing assembly with a rotating annular member designed for a hub bearing unit for a vehicle, insertable in an annular gap delimited by a rotating member and a stationary member, which are mutually coaxial, to protect at least one crown of rolling bodies arranged between the stationary member and the rotating member, and comprising:
    a first annular shield provided with a first sleeve portion integral in use with the rotating member and a first flange portion which extends radially and overhangingly from the first sleeve portion, the first flange portion further comprising first and second radially extending portions connected by an axially extending portion, wherein the second radially extending portion does not contact the rotating member, the first sleeve portion and the first radially extending portion being connected by a linear portion when viewed in axial cross-section;
    a second annular shield provided with a second sleeve portion integral in use with the stationary member and with a flange portion overhangingly carried by the second sleeve portion, radially on side opposite to the first flange portion and in front of it; and
    an annular sealing ring provided with at least one first and one second annular lip;
    wherein the first sleeve portion of the first shield is delimited by a lateral mounting surface facing towards the rotating member and having conic-truncated geometry with tapering directed so that a greater diameter of the lateral mounting surface is arranged on the side of the first flange portion and essentially at a first end of the first sleeve portion from which the first flange portion overhangingly extends; and
    wherein the sleeve portion couples with an assembly seat of the rotating annular member formed by an annular shallow recess delimited by:
    a conic-truncated bottom surface having tapering directed in the same sense as the tapering of the lateral mounting surface; and
    by an axial shoulder arranged on the side opposite to the flange portion, wherein the axial shoulder has a maximum radial dimension less than a maximum radial dimension of a second end of the sleeve portion;
    wherein the conic-truncated bottom surface of the annular shallow recess has a length in axial direction essentially identical to the extension in length in axial direction of the first sleeve portion and the axial shoulder is defined by an annular relief which delimits the shallow recess towards a frontal free rim of the rotating annular member;
    wherein, in combination:
    i)—the annular relief of the rotating annular member has a rounded saw-tooth profile in radial section defined towards the shallow recess by a conical surface with tapering facing the side opposite to the conic-truncated shaped surface and which joins to the conic-truncated shaped surface, so that the total axial length of the annular shallow recess is greater than that of the first sleeve portion in the direction of extension in axial direction of the conical surface of the annular relief; and
    ii)—the annular shallow recess defining the assembly seat of the rotating annular member is obtained on a lateral cylindrical mounting surface of the rotating annular member starting from the side opposite to the frontal free rim of the annular rotating member, the diameter of the lateral cylindrical mounting surface of the rotating member is essentially equal to or slightly greater than the diameter of the annular relief at a maximum radial height thereof.

2. A coupling system according to claim 1, wherein the first sleeve portion is defined by a conic-truncated-shaped tubular rotation solid with tapering facing the side opposite to the first flange portion.

3. A coupling system according to claim 1, wherein at least said first shield is made of a pressed, sheared metallic sheet, so that the first sleeve portion is elastically deformable at least towards the second end of the first sleeve portion, opposite to the first end.

4. A coupling system according to claim 1, wherein the annular shallow recess defining the assembly seat of the rotating annular member is obtained so as to become deeper towards the annular relief, at which the annular shallow recess has a maximum radial depth.

5. A coupling system according to claim 4, wherein the greater diameter of the conic-truncated lateral mounting surface towards the rotating annular member of the first sleeve portion is such to make an interference coupling, either forced or slightly forced, between the first sleeve portion and the annular relief already at a first end of the first sleeve portion from which the first flange portion radially and overhangingly extends.

6. A coupling system according to claim 1, wherein the conic-truncated lateral mounting surface facing towards the rotating annular member of the first sleeve portion and the conic-truncated bottom surface of the shallow recess have an essentially comparable inclination angle with respect to a common symmetry axis of the rotating annular member and of the first annular shield, the angle formed by the common symmetry axis and the conic-truncated lateral mounting surface being either equal to or slightly greater than that formed by the conic-truncated bottom wall of the annular shallow relief and the common symmetry axis.

7. A wheel hub bearing unit comprising:
    an outer ring, stationary in use,
    an inner ring, rotating in use, having an end provided with a flange on the side opposite to the outer ring,
    at least one crown of rolling bodies interposed between the outer ring and the inner ring, and
    a sealing assembly comprising at least one first shield provided with a first sleeve portion integral in use with the inner ring and a first flange portion which extends radially and overhangingly from the first sleeve portion, the first flange portion further comprising first and second radially extending portions connected by an axially extending portion, wherein the second radially extending portion does not contact the rotating member, the first sleeve portion and the first radially extending portion being connected by a linear portion when viewed in axial cross-section,
    the first shield being mounted radially interposed between the outer ring and the inner ring so that the first flange portion is arranged axially interposed in an annular space comprised between the flanged end and the outer ring;

wherein the first sleeve portion of the first shield is delimited by a lateral mounting surface facing towards the inner ring and having conic-truncated geometry having tapering directed so that the greater diameter of the lateral mounting surface is arranged on the side of the first flange portion and essentially at a first end of the first sleeve portion from which the first flange portion extends radially and overhangingly;

wherein the inner ring has between the flanged end and a frontal free rim thereof which delimits a rolling track for the rolling bodies, a later cylindrical surface provided with an assembly seat for the sleeve portion of the first shield, which assembly seat is defined by an annular shallow recess delimited by a conic-truncated bottom surface having tapering facing the same direction as the tapering of the lateral assembly surface; and an axial shoulder arranged on the side opposite to the flange portion, the axial shoulder has a maximum radial dimension less than a maximum radial dimension of a second end of the sleeve portion; the conic-truncated bottom surface of the annular shallow recess having a length in axial direction essentially identical to the extension in length in axial direction of the first sleeve portion and the axial shoulder being defined by an annular relief which delimits the shallow recess towards a frontal free rim of the rotating annular member; wherein, in combination:

i)—the annular relief of the rotating annular member has a rounded saw-tooth profile in radial section defined towards the shallow recess by a conical surface with tapering facing the side opposite to the conic-truncated shaped surface and which joins to the conic-truncated shaped surface, so that the total axial length of the annular shallow recess is greater than that of the first sleeve portion in the direction of extension in axial direction of the conical surface of the annular relief; and ii)—the annular shallow recess defining the assembly seat of the rotating annular member is obtained on a lateral cylindrical mounting surface of the rotating annular member starting from the side opposite to the frontal free rim of the annular rotating member, the diameter of the lateral cylindrical mounting surface of the rotating member is essentially either equal to or slightly greater than the diameter of the annular relief at a maximum radial height thereof.

* * * * *